(12) United States Patent
Hornisch et al.

(10) Patent No.: US 7,958,963 B2
(45) Date of Patent: Jun. 14, 2011

(54) ASSEMBLY SUPPORT FOR A MOTOR VEHICLE TRANSMISSION

(75) Inventors: Werner Hornisch, Weissach (DE); Francesco Germano, Bietigheim-Bissingen (DE)

(73) Assignee: Dr. Ing. h.c. F. Porsche AG, Suttgart (DE)

( * ) Notice: Subject to any disclaimer, the term of this patent is extended or adjusted under 35 U.S.C. 154(b) by 107 days.

(21) Appl. No.: 12/430,466

(22) Filed: Apr. 27, 2009

(65) Prior Publication Data

US 2009/0283352 A1 Nov. 19, 2009

(30) Foreign Application Priority Data

May 13, 2008 (DE) .................. 10 2008 023 340

(51) Int. Cl.
*B62D 21/02* (2006.01)
*B60K 17/00* (2006.01)

(52) U.S. Cl. ............... 180/312; 180/377; 280/124.109; 280/781; 280/785; 296/204

(58) Field of Classification Search .................. 180/292, 180/299, 311, 312, 377; 280/124.109, 781, 280/785, 787, 788, 794; 296/203.02, 204, 296/187.08, 203.04, 205
See application file for complete search history.

(56) References Cited

U.S. PATENT DOCUMENTS

| | | | |
|---|---|---|---|
| 4,863,214 A * | 9/1989 | Kranis, Jr. ................. | 280/797 |
| 5,280,957 A * | 1/1994 | Hentschel et al. ........... | 280/788 |
| 5,411,308 A | 5/1995 | Kreis et al. | |
| 5,562,308 A * | 10/1996 | Kamei et al. ................ | 280/788 |
| 6,357,819 B1 | 3/2002 | Yoshino | |
| 6,935,681 B2 | 8/2005 | Hasler et al. | |
| 2004/0130185 A1* | 7/2004 | Hasler et al. .............. | 296/193.06 |
| 2005/0082782 A1* | 4/2005 | Jolley .................... | 280/124.109 |
| 2006/0284449 A1* | 12/2006 | Miyahara .................. | 296/204 |

FOREIGN PATENT DOCUMENTS

| | | |
|---|---|---|
| DE | 1007187 B | 4/1957 |
| DE | 43 40 445 C2 | 1/1997 |
| DE | 10 2006 013 548 A1 | 10/2007 |
| DE | 10 2007 006 722 A1 | 12/2008 |
| EP | 0 587 596 B1 | 7/1995 |
| EP | 1 006 022 A2 | 6/2000 |
| EP | 1 759 964 A1 | 3/2007 |

OTHER PUBLICATIONS

German Search Report dated Feb. 9, 2009.

* cited by examiner

*Primary Examiner* — Paul N Dickson
*Assistant Examiner* — Joseph Rocca

(57) ABSTRACT

An assembly support has a supporting element which is connected to the vehicle body and has an upper shell with a connected closing plate, and reinforcing bars are arranged in the region of fastening openings between the upper shell and the closing plate. A bridge support is connected to the supporting element, the bridge support is held with free limb ends in bearing eyes of the supporting element, and a bearing spindle for a transmission bearing being arranged between the bearing eyes.

7 Claims, 5 Drawing Sheets

ASSEMBLY SUPPORT FOR A MOTOR VEHICLE TRANSMISSION

CROSS-REFERENCE TO RELATED APPLICATION

This application claims the priority, under 35 U.S.C. §119, of German application DE 10 2008 023 340.4, filed May 13, 2008; the prior application is herewith incorporated by reference in its entirety.

BACKGROUND OF THE INVENTION

Field of the Invention

The invention relates to an assembly support for a motor vehicle transmission, the end side of which assembly support is held via a transmission bearing on a supporting element connected to the vehicle body.

Published, European patent application EP 100 60 22 A2, corresponding to U.S. Pat. No. 6,357,819, discloses motor vehicle mounting structures which have reinforcing parts arranged on the inside in profiles of the mounting structure. Furthermore, published, European patent application EP 17 599 64 A1 discloses reinforcing ribs in motor vehicle mounting structures, which reinforcing ribs are held in profiles via pins.

SUMMARY OF THE INVENTION

It is accordingly an object of the invention to provide an assembly support for a motor vehicle transmission which overcomes the above-mentioned disadvantages of the prior art devices of this general type, which can be fitted in a simple manner and ensures a stable mounting of the transmission, at least in a rear bearing point thereof, in the event of external forces acting on the vehicle.

With the foregoing and other objects in view there is provided, in accordance with the invention, an assembly support for a transmission of a motor vehicle. The assembly support contains a supporting element connected to a vehicle body and has an upper shell with a connected closing plate. The supporting element has fastening openings formed therein. The supporting element further has reinforcing bars disposed in a region of the fastening openings between the upper shell and the closing plate. An end side of the transmission, via a transmission bearing, is supported by the supporting element.

The advantages primarily obtained with the invention are that, in particular in the event of a side crash of the vehicle, the supporting element remains stable when longitudinal and transverse forces occur. This is achieved by the assembly support containing a supporting element which is connected to the vehicle body and includes an upper shell with a connected closing plate, and reinforcing bars being arranged in the region of fastening openings between the upper shell and the closing plate.

In order for even vertical forces to be reliably absorbed, it is provided, according to a further proposal, that the supporting element contains, on a front side—with respect to the direction of travel—two bearing eyes for receiving a bridge support which is of a U-shaped configuration and is arranged in a vertical transverse plane in the vehicle and has two spaced-apart limbs and an upper supporting web for fastening to the vehicle body. The free limb ends of the bridge support are held in the bearing eyes of the supporting element, and a bearing spindle for the transmission bearing is arranged between the bearing eyes. The effect advantageously achieved by this measure according to the invention is that a mounting which is secure in terms of strength is provided for the transmission by the connection of the supporting element to the bridge support and multiple fastening to the vehicle body. In particular in the event of external forces acting on the vehicle, such as, for example, in the event of a crash, forces in the vertical, longitudinal and transverse directions are optimally absorbed.

According to a further proposal, the upper shell is of a substantially trapezoidal configuration and has sections between apertures, which sections are configured in the shape of a U profile in cross section and merge into one another. Reinforcing bars are arranged in each case in the outer sections of the upper shell, the reinforcing bars each having sleeve parts concentrically with respect to the fastening openings, the sleeve parts being connected to one another via a web. By this configuration with sections which are in each case in the shape of a U profile and merge into one another in the manner of lattice work, a supporting element which is optimum in terms of strength is obtained, with distortion of the upper shell and of the closing plate via screw being avoided by the reinforcing bars placed in between, and at the same time the bonded strength of the upper shell to the connected closing plate is increased.

So that a simple positioning of the reinforcing bars with respect to the fastening openings can be obtained, at least two protruding positioning pins are arranged on the web of the reinforcing bars, the positioning pins engaging in a latching manner in corresponding openings in the upper shell.

Furthermore, according to a further proposal, the upper shell is produced from a molded sheet-metal part, and the inserted reinforcing bars are composed of a plastic material. It is likewise possible for the reinforcing bars to be formed from steel or sheet metal.

Other features which are considered as characteristic for the invention are set forth in the appended claims.

Although the invention is illustrated and described herein as embodied in an assembly support for a motor vehicle transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
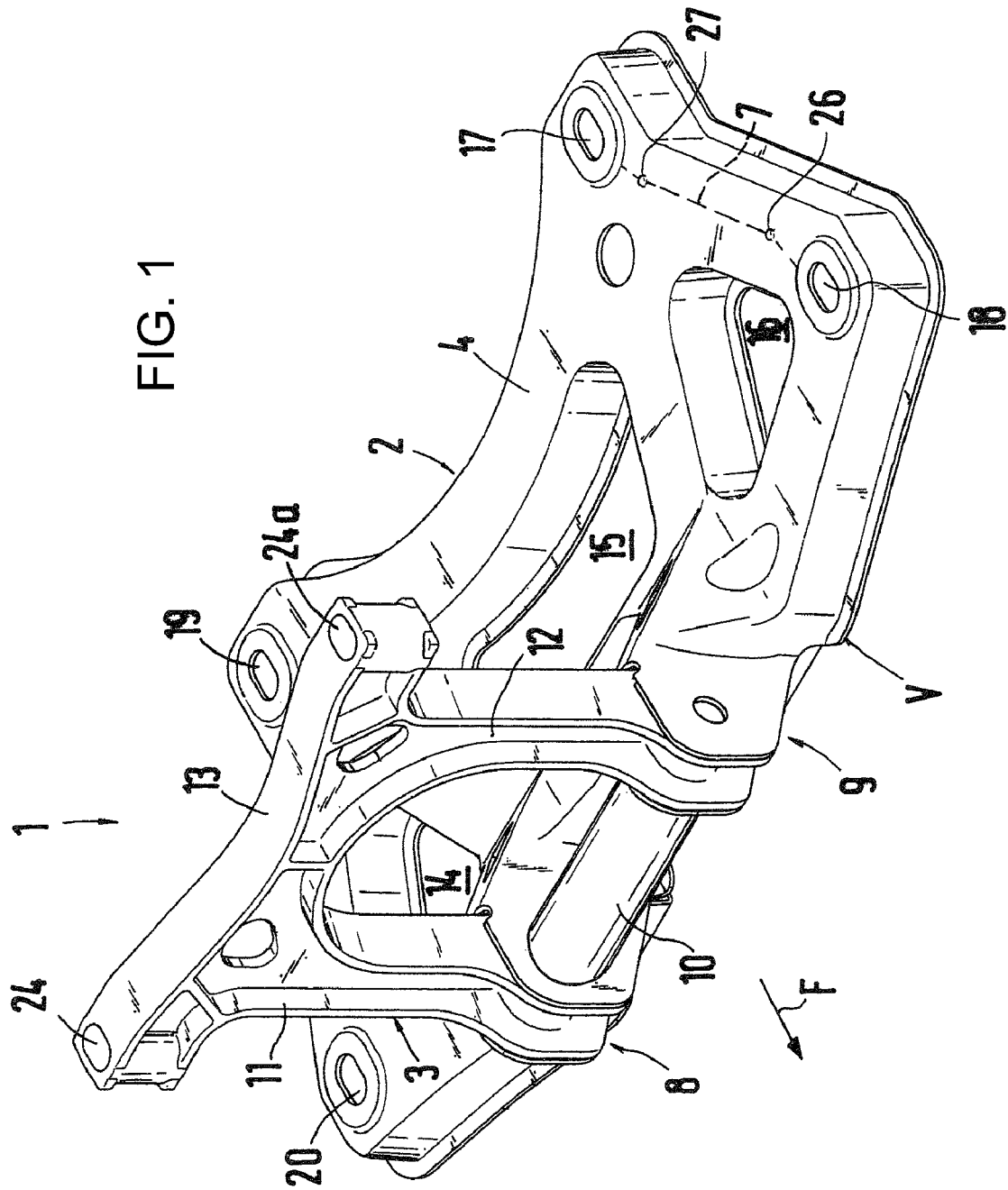
FIG. 1 is a diagrammatic perspective view of an assembly support with a supporting element and a bridge support according to the invention.
Figure 6:
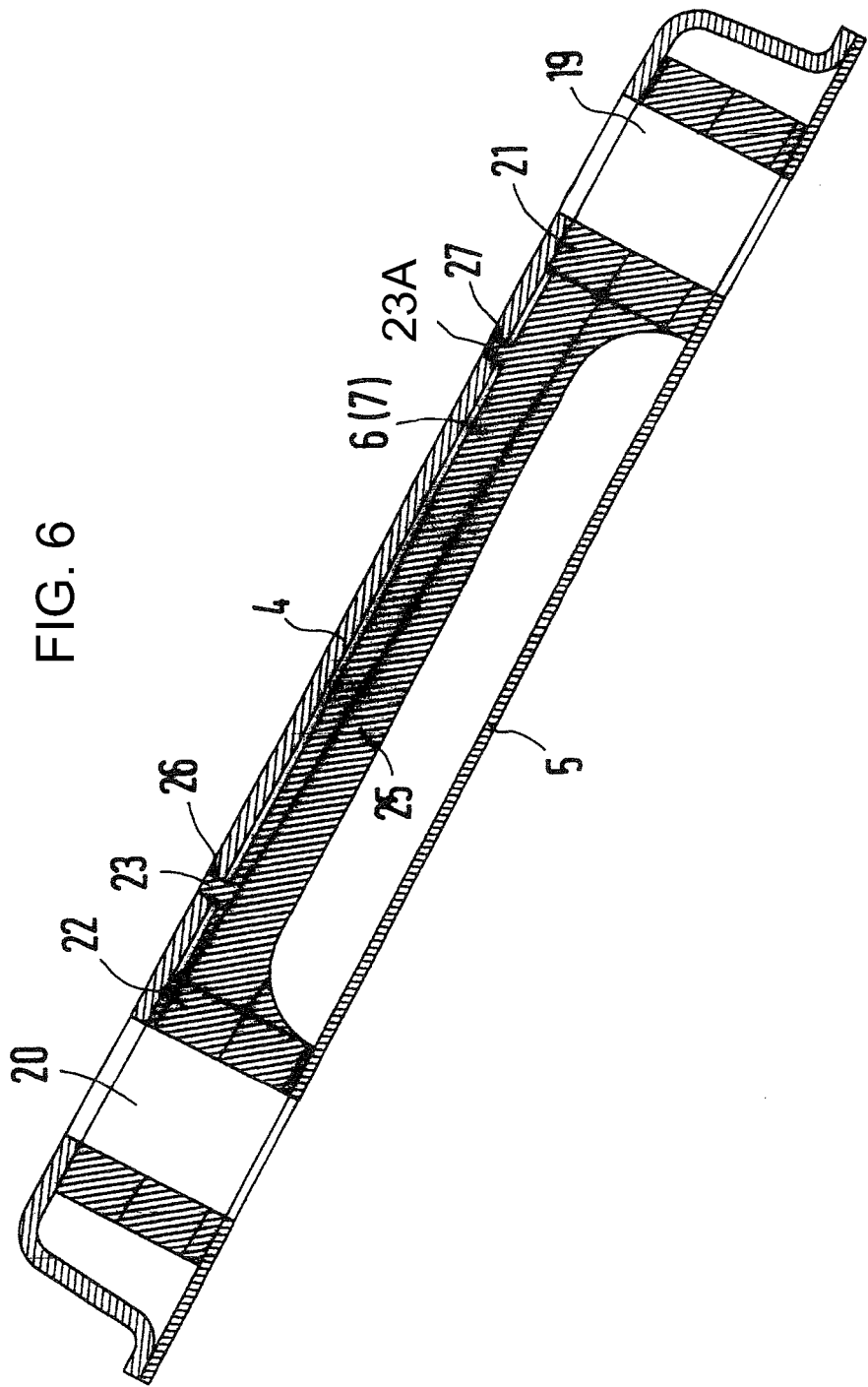
FIG. 6 is a diagrammatic, sectional view through the upper shell, the closing plate and the reinforcing bars taken along the line VI-VI shown in FIG. 5.

Referring now to the figures of the drawing in detail and first, particularly, to FIG. 1 thereof, there is shown an assembly support 1 for a motor vehicle transmission having a supporting element 2 and a bridge support 3. The supporting element 2 has an upper shell 4 with a connected, planar closing plate 5 (see FIG. 6) which rests on bent free ends of the upper shell 4 and is connected to the ends, for example, by welding. Reinforcing bars 6, 7 are inserted between the upper shell 4 and the closing plate 5 (see FIG. 2).

The supporting element 2 is connected to the bridge support 3, and both the supporting element 2 and the bridge support 3 are fastened to the vehicle body via screws. A bearing spindle 10 for a transmission bearing is arranged between bearing eyes 8, 9 on a front side V of the upper shell 4.

The bridge support 3 is of a U-shaped configuration and is arranged in a vertical transverse plane of the vehicle and has two spaced-apart limbs 11, 12 and is provided with an upper supporting web 13, the end side of which has openings 24, 24a toward the vehicle body for fastening screws. The free ends of the limbs 11, 12 are held in the bearing eyes 8, 9 of the supporting element 2, through which bearing eyes the bearing spindle 10 for the transmission bearing extends.

The upper shell 4 of the supporting element 2 is of a substantially trapezoidal configuration and contains sections S1 to S7 between apertures 14, 15, 16, which sections are configured in the shape of a U profile in cross section and merge into one another.

The reinforcing bars 6, 7 are inserted in each case in the outer sections S1 and S2 of the upper shell 4 of the supporting element 2. They extend between the fastening openings 17, 18 and 19, 20 in the upper shell 4. On the end side of a web 25, the reinforcing bars 6, 7 in each case have a sleeve part 21, 22 which is arranged in each case concentrically with respect to the fastening openings 17, 18 and 19, 20. The sleeve parts 21, 22 bear in each case on the end side on the upper shell 4 and on the closing plate 5 in a sheetlike manner.

Figure 4:
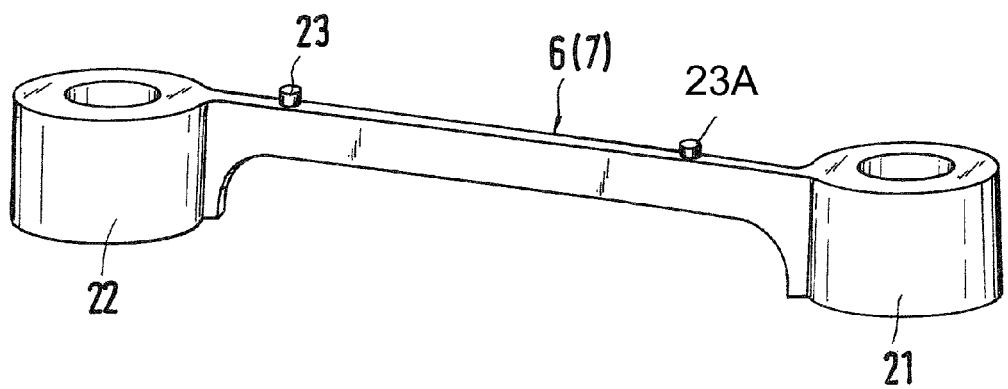
FIG. 4 is a diagrammatic perspective view of the reinforcing bar.
Figure 5:
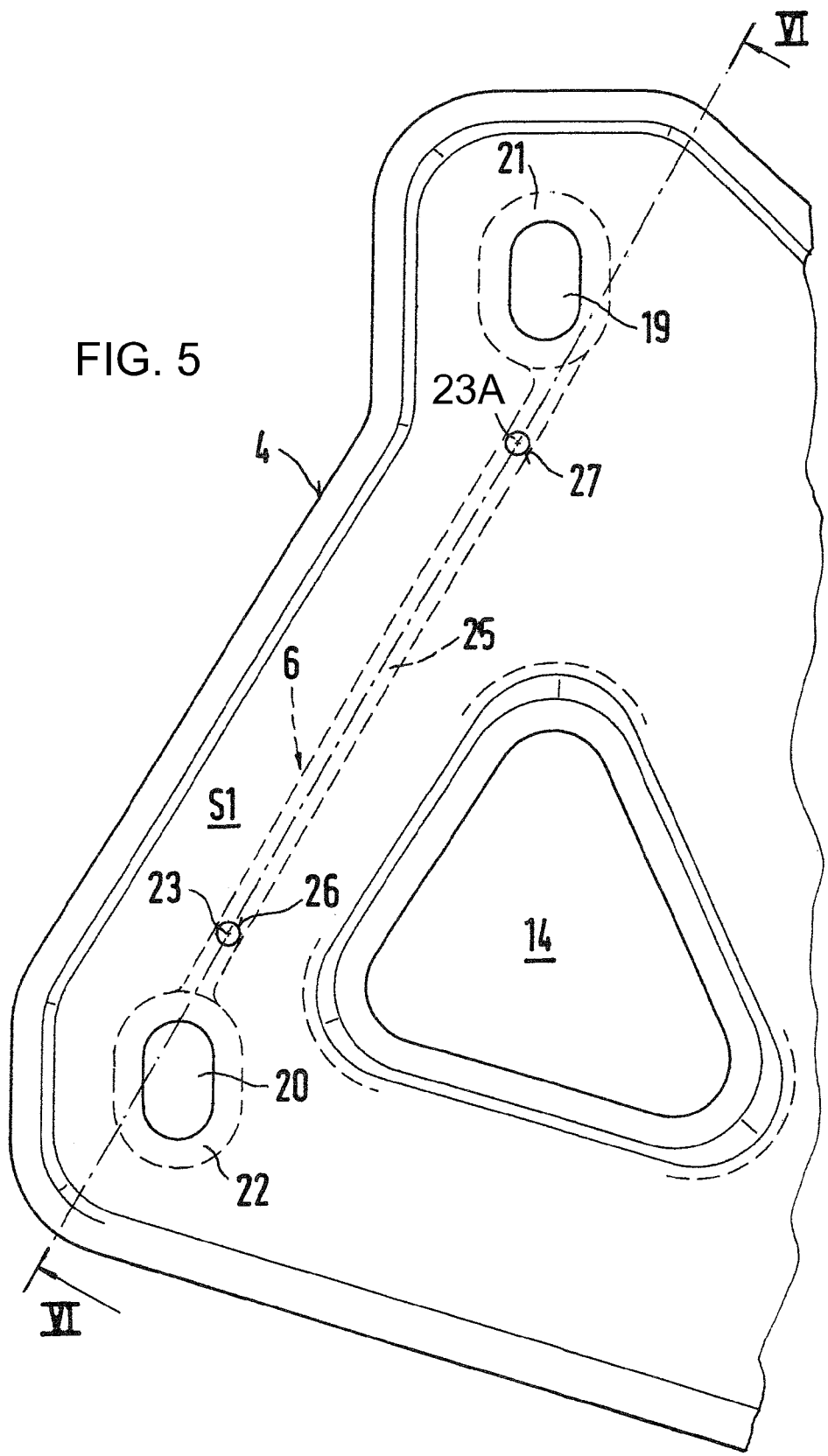
FIG. 5 is a diagrammatic, top perspective view of part of the supporting element with the reinforcing bar inserted.

At least two projecting pins 23, 23A which are held in a clamping manner in openings 26, 27 in the upper shell 4 are integrally formed on the web 25 of the reinforcing bar 6, 7 (FIGS. 4 and 5).

Figure 2:
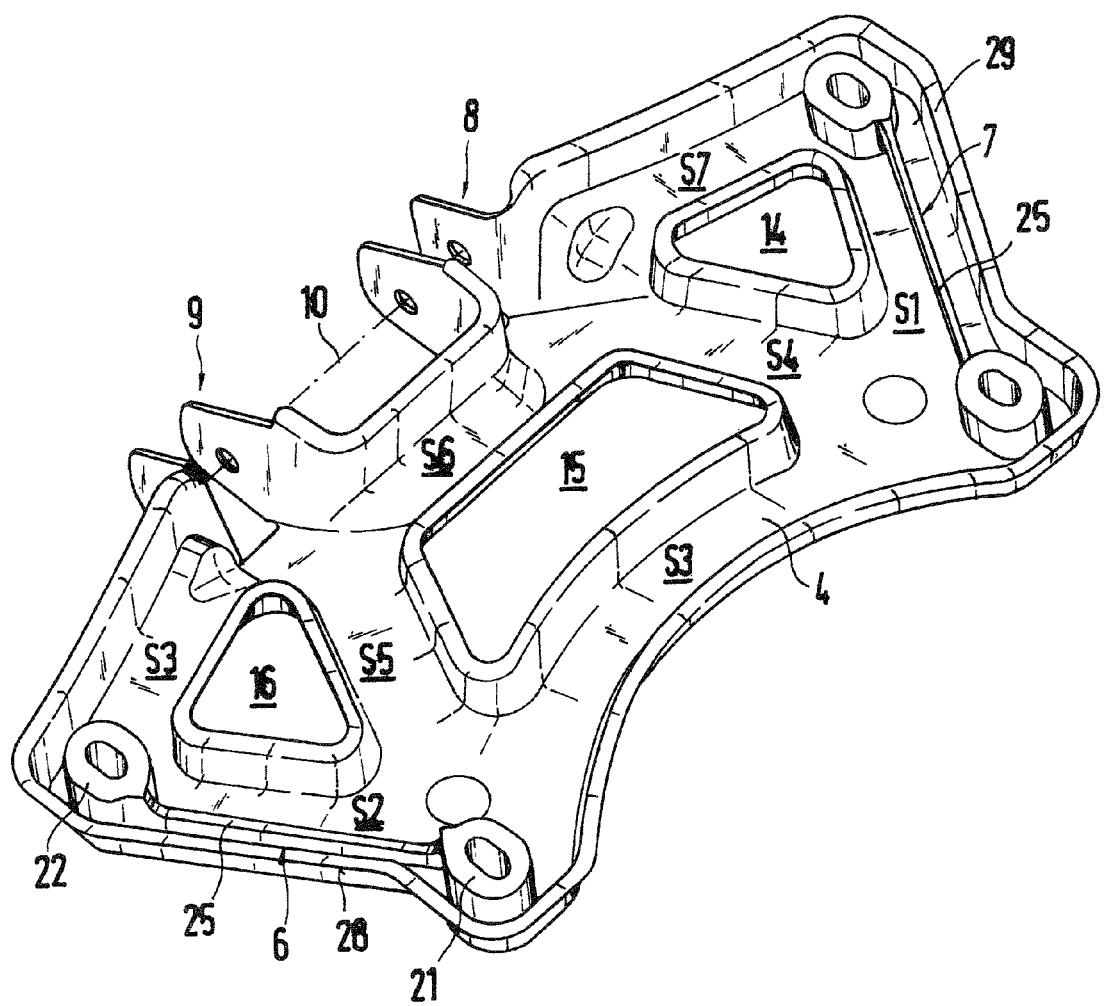
FIG. 2 is a diagrammatic perspective view from below into an upper shell of the supporting element with reinforcing bars inserted therein.
Figure 3:
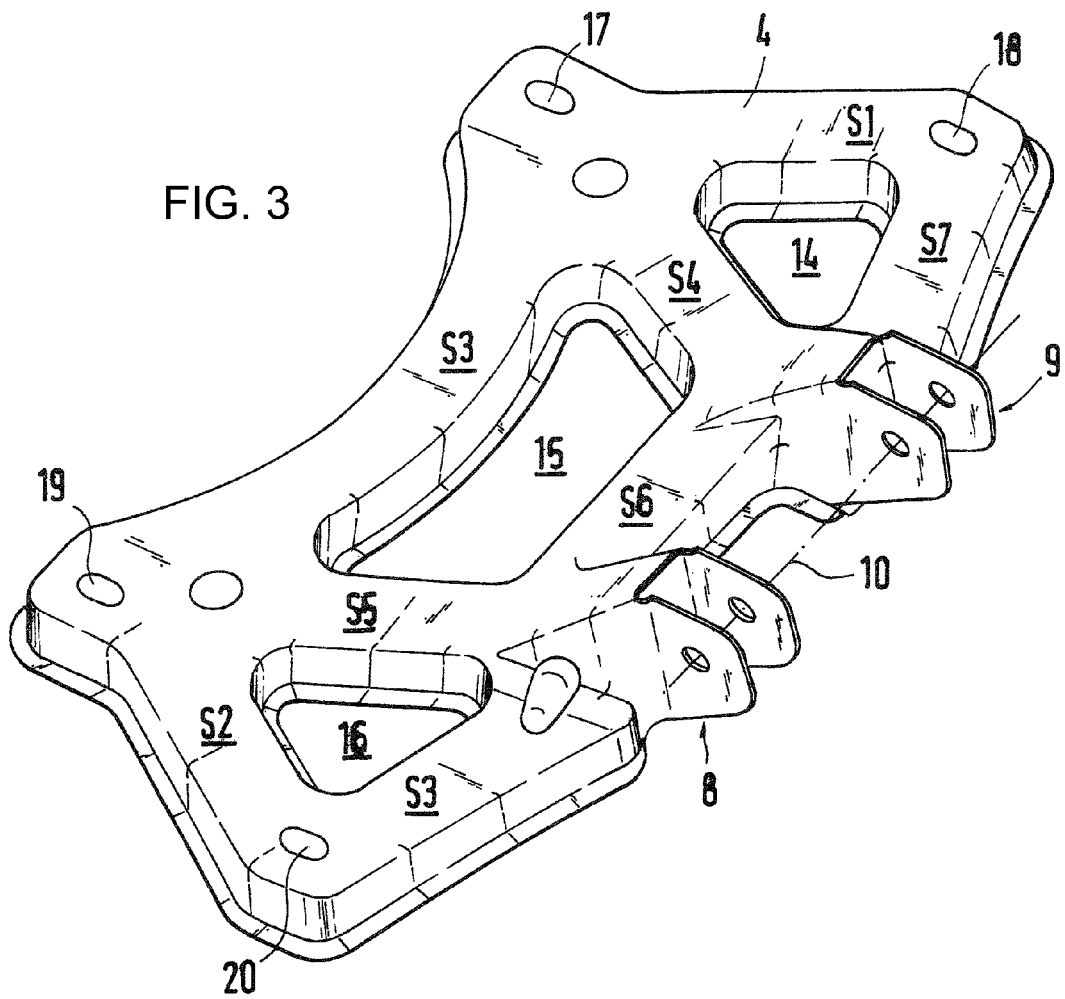
FIG. 3 is a diagrammatic perspective view of from above of the upper shell.

Between the two sleeve parts 21, 22, the web 25 has a parallel profile to the outer side edges 28, 29 of the upper shell 4 (FIG. 2). The size of the gap of the web 25 with respect to the upper shell 4 is configured to be smaller than the size of the gap between the closing plate 5 and the web 25. On the end side, the web 25 is raised as far as the end surface of the sleeve part 21, 22.

The upper shell 4 is preferably composed of a sheet-metal molded part, and the reinforcing bars 6, 7 are produced from a plastic, but the latter may also be composed of a metal.

The supporting element 2 is installed on the vehicle body via a screw connection through the four openings 17 to 20 arranged at the corners in the upper shell 4 and the closing plate 5, with the screwing of the bridge support 3 taking place through the two openings 24, 24a arranged in the corners of the supporting web 13.

The invention claimed is:

1. An assembly support for a transmission of a motor vehicle, the assembly support comprising:
   a supporting element connected to a vehicle body and having an upper shell with a connected closing plate, said supporting element having fastening openings formed therein, said supporting element further having reinforcing bars disposed in a region of said fastening openings between said upper shell and said closing plate, an end side of the transmission, via a transmission bearing, is supported by said supporting element;
   a bridge support being U-shaped and having two spaced-apart limbs and an upper supporting web with an end side having openings formed therein for fastening to the vehicle body; and
   said supporting element further having two bearing eyes disposed on a front side, with respect to a direction of travel, for receiving said bridge support disposed in a vertical transverse plane of the motor vehicle.

2. The assembly support according to claim 1,
   wherein said spaced-apart limbs have free limb ends held in said bearing eyes of said supporting element; and
   further comprising a bearing spindle for the transmission bearing disposed between said bearing eyes.

3. The assembly support according to claim 1, wherein said upper shell is of a trapezoidal design and has apertures formed therein and sections disposed between said apertures, said sections are configured in a shape of a U profile in cross section and merge into one another.

4. The assembly support according to claim 1, wherein:
   said upper shell has outer sections; and
   said reinforcing bars are disposed in each case in said outer sections, said reinforcing bars in each case have a web and sleeve parts disposed concentrically with respect to said fastening openings, said sleeve parts being connected to each other via said web running adjacent to said upper shell and to said closing plate.

5. The assembly support according to claim 4, wherein:
   said upper shell having further openings formed therein; and
   said web of said reinforcing bars has at least two protruding positioning pins which engage in a latching manner in said further openings corresponding thereto in said upper shell.

6. The assembly support according to claim 4, wherein said web disposed between said two sleeve parts has a parallel profile to an outer side edge of said upper shell, and said web has a smaller gap in relation to said upper shell than in relation to said closing plate, and said web has ends which are integrally formed on said sleeve parts and correspond, when raised, to a height of said sleeve parts.

7. The assembly support according to claim 1, wherein said upper shell is composed of a shaped sheet-metal part and a plastic material is used for said reinforcing bars inserted therein.

* * * * *